United States Patent

Peter et al.

[11] 3,927,063
[45] Dec. 16, 1975

[54] WATER-INSOLUBLE STYRYL DYESTUFFS

[75] Inventors: Richard Peter; Hansjoerg Angliker, both of Basel, Switzerland

[73] Assignee: Ciba-Geigy AG, Basel, Switzerland

[22] Filed: May 1, 1970

[21] Appl. No.: 33,934

Related U.S. Application Data

[63] Continuation-in-part of Ser. No. 665,738, Sept. 6, 1967, abandoned.

[30] Foreign Application Priority Data

Sept. 9, 1966  Switzerland................... 13089/66

[52] U.S. Cl.................. 260/465 D; 8/54.2; 8/179; 260/247.1 R; 260/247.2 A; 260/247.2 B; 260/247.5 R; 260/247.7 R; 260/247.7 A; 260/283 CN; 260/287 R; 260/288 R; 260/289 R; 260/455 R; 260/455 A; 260/456 A; 260/463; 260/465 E

[51] Int. Cl.$^2$........................................ C07C 121/78

[58] Field of Search................ 260/465 D, 465 E

[56] References Cited

UNITED STATES PATENTS

| | | | |
|---|---|---|---|
| 2,766,233 | 10/1956 | Kartinos.......................... | 260/465 X |
| 3,386,491 | 6/1968 | Weaver............................ | 260/465 X |
| 3,435,062 | 3/1969 | Marrable........................... | 260/465 |
| 3,504,010 | 3/1970 | Straley et al...................... | 260/465 |

*Primary Examiner*—Lewis Gotts
*Assistant Examiner*—Dolph H. Torrence
*Attorney, Agent, or Firm*—Joseph G. Kolodny; Prabodh I. Almaula; Michael W. Glynn

[57] ABSTRACT

Water-insoluble styryl dyestuffs of the formula

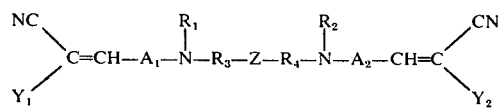

in which $R_1$ and $R_2$ each represents an alkyl group which may be substituted and which may be joined to the radicals $A_1$ and $A_2$ respectively to form a ring, $R_3$ represents an alkylene group which may be substituted, $R_4$ represents a direct bond or an alkylene group which may be substituted, $Y_1$ and $Y_2$ each represents a cyano, carbalkoxy or arylsulphonyl group, $A_1$ and $A_2$ each represents a para-phenylene group which may be substituted and Z represents a direct bond or a colourless bridging group free from -$SO_2$ groups, yield valuable yellow dyeings of high fastness to light and sublimation on polyester fibres.

5 Claims, No Drawings

WATER-INSOLUBLE STYRYL DYESTUFFS

CROSS-REFERENCE TO RELATED APPLICATION

This is a continuation-in-part of Ser. No. 665,738, filed Sept. 6, 1967, now abandoned.

The present invention provides new and valuable water-insoluble styryl dyestuffs of the formula

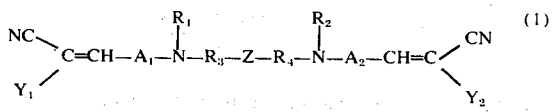

in which $R_1$ and $R_2$ each represents an alkyl group which may be substituted and which may be joined to the residues $A_1$ and $A_2$ respectively to form a ring, $R_3$ represents an alkylene group which may be substituted, $R_4$ represents a direct bond or preferably an alkylene group which may be substituted, $Y_1$ and $Y_2$ each represents a cyano, carbalkoxy or arylsulphonyl group, $A_1$ and $A_2$ each represents a para-phenylene group and Z represents a direct bond or a colourless bridging group free from $-SO_2$ groups.

The new dyestuffs may be obtained, for example, when a. a dyestuff of the formula

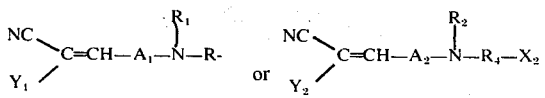

in which $X_1$ and $X_2$ each represents a group containing at least one reactive hydrogen atom, preferably an amino, mercapto or hydroxyl group or a reactive derivative thereof, $R_1$, $R_2$, $R_3$ and $R_4$ each represents an alkyl or alkylene group which may be substituted and $A_1$, $A_2$, $Y_1$ and $Y_2$ have the meanings given above, is reacted with a bifunctional compound free from $SO_2$ groups to form a dyestuff of the invention represented by the formula (1), or b. a dialdehyde of the formula

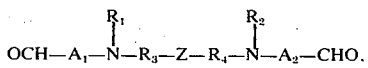

or an aldimine thereof is condensed in a molar ratio of 1:2 with a cyano compound of the formula

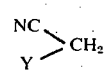

or c. a monostyryl dyestuff containing a reactive hydrogen atom bound to an amino group and which corresponds to the formula

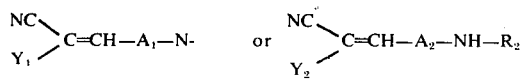

is reacted with a bifunctional compound of the formula

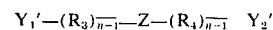

in which $n = 1$ or 2, $Y_1'$ and $Y_2'$ each represents a reactive negative residue, preferably a halogen atom, when $n = 2$, or in which $Y_1'$ and $Y_2'$, together with Z, form a diepoxy compound capable of additive reaction when $n = 1$, or d) when $X_1$ and $X_2$ in a styryl dyestuff of the formula

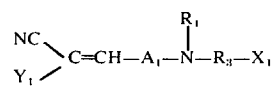

or

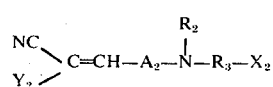

given under (a) each represents an -SH group, oxidation is carried out to form a dyestuff of the formula (1) in which Z then represents a bridging group of the formula $-S-S-$.

In the manufacturing processes it is possible to use components containing either identical residues $A_1$, $A_2$, $R_1$ and $R_2$, as well as $R_3$ and $R_4$ to produce symmetrical bis-styryl dyestuffs or starting materials in which one or more of these residues are different to produce unsymmetrical styryl dyestuffs.

Examples of residues $A_1$ and $A_2$ are 1,4-phenylene groups of the formula

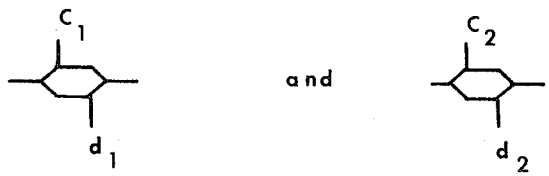

in which $c_1$, $c_2$, $d_1$ and $d_2$ each represents a hydrogen or halogen atom, especially a chlorine or a bromine atom, a low alkyl group, for example, a methyl or ethyl group or a low alkoxy group, for example, a methoxy or ethoxy group or a thiophenoxy or phenoxy residue.

The groups $c_1$ and $c_2$ are preferably bound in ortho-position to the C=C double bond and, in addition to the above-mentioned preferred groups, may also each represent a trifluoromethyl group, an alkylsulphonyl group, preferably a methylsulphonyl group, or an acylamino group which may be alkylated at the nitrogen atom, for example, a methylated acylamino group in which the acyl residue is the residue of an organic monocarboxylic acid or the residue of an organic monosulphonic acid, for example, methane-, ethane- or para-toluene-monosulphonic acid, or the residue of a carbamic acid- or carbonic acid-monoester or monoamide, for example, a phenoxy- carbonyl, methoxycarbonyl or aminocarbonyl residue.

The groups $d_1$ and $d_2$ are preferably in ortho-position to the amino group which governs coupling.

The groups $R_1$ and $R_2$ may represent hydrogen atoms or alkyl groups that may be substituted and interrupted by oxygen atoms, such as methyl, ethyl, propyl, butyl, or beta-ethoxy-ethyl, butoxybutyl or methoxyethyl, halogenated alkyl, such as beta-chloroethyl, beta,beta,-beta-trifluoroethyl, beta,gamma-dichloropropyl, hydroxyalkyl, such as beta-hydroxyethyl, nitro-alkyl, such as beta-nitroethyl, hydrocarbylcarbonylethyl, for example beta -(acetyl-, formyl-, acryloyl)aminoethyl, gamma-acetamidopropyl, beta-(benzoyl-, p-methylbenzoyl or p-chloro-benzoyl)aminoethyl, hydrocarbylcarbonyloxyalkyl, for example beta-(acetoxy-, benzoyloxy-, butyryloxy-, p-methoxybenzoyl-, p-,m-,o-chlorobenzoyl-, thenoyl- or p-phenoxy)-ethyl, or butyryloxybutyl, cyanoalkoxyalkyl, for example beta-cyanoethoxyethyl, beta-carboxyethyl, hydrocarbylcarbonyloxycarbonyl, for example beta-(methoxy, ethoxy, isopropyloxy, benzoyloxy or p-toluyloxy)carbonyloxyethyl or -propyl, hydrocarbyloxy-carbonylalkyl, for example beta-(methyl-, ethyl-, butyl-, phenyl- or methoxy-phenyl)-oxycarbonylethyl, and aryloxy-alkyl, for example beta-phenyloxyethyl, gamma-toluyloxypropyl and beta-(p-methoxyphenyloxy)ethyl. The groups $R_1$ and $R_2$ generally contain at least 2 carbon atoms and not more than 15; preferably they contain not more than 10 carbon atoms.

When the groups $R_1$ and/or $R_2$ are to form a hydrogenated heterocyclic ring with the vicinal phenylene groups $A_1$ or $A_2$, the starting materials used are, for example, tetra-hydroquinoline derivatives or benzomorpholine derivatives as components of the formula

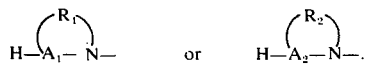

The compounds used are, for example, 2,2,4,7-tetramethyl-1,2,3,4-tetrahydroquinoline, 7-methyl-1,2,3,4-tetrahydroquinoline and so forth.

The groups $R_3$ and $R_4$ are alkylene groups which may be substituted and which preferably contain at least two carbon atoms, for example, unsubstituted ethylene groups or, in accordance with a special embodiment of the invention, alkylene groups hydroxylated in $\beta$-position to the amino group, which may also be components of an alicyclic ring system. The latter are formed, for example, during the bilateral reaction of diepoxides, especially diglycidyl compounds, with the components H—$A_1$—$NHR_1$ and H—$A_1$—$NHR_2$ which contain at least one reactive hydrogen atom or the corresponding styryl dyestuffs. The hydroxyl groups formed in $\beta$-position may be substituted, wherein the substituents, together with the hydroxyethyl groups leading to the nitrogen atom, may be identical with the groups $R_1$ and $R_2$ defined above, in so far as they are derived from an N-hydroxyethyl group starting from the nitrogen atom.

The colourless bridging group Z, which is preferably an oxygen atom, an imino group or especially a colourless divalent organic residue, is primarily a group corresponding to one of the following formulae:

$_2$—CH$_2$—O—, —O—R$_5$—O— , in which $R_5$ is a divalent aliphatic, araliphatic or aromatic residue in which the carbon chain may be interrupted by a hetero atom, especially an oxygen atom, preferably a residue of the formula

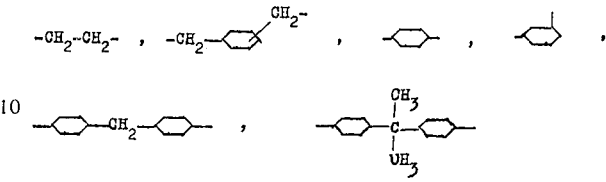

and especially acyl residues containing groups of the formulae —OCO—, —OCOO—, —OCOCOO—, —NHCO—, —CONH—, —CONHCO—, —CONHNHCO— or —NHCOCONH— as well as the colourless connecting group of the formula —X'CO—R$_6$—COX'—, in which X' represents an oxygen atom, a sulphur atom or an —NH group and R$_6$ represents an aliphatic, aromatic or heterocyclic residue; the colourless connecting group of the formula —X'—CO—NH—R$_7$—NH—CO—X'—, in which X' represents an oxygen atom, a sulphur atom or an —NH group and R$_7$ represents an aliphatic, aromatic or heterocyclic residue of a diisocyanate, preferably an ethylene, hexamethylene, para-phenylene or toluylene residue or a residue of the formula

the colourless bridging group of the formula —OCOX'—R$_8$—X'—OCO—, in which X' has the meaning given above and R$_8$ represents a divalent organic residue, especially an aliphatic, araliphatic, aromatic or heterocyclic residue which may be interrupted by a group X' (when X' is an —NH group, R$_8$ has the same meaning as R$_7$) and the colourless connecting group of the formula —X''SO$_2$—R$_9$—SO$_2$X''— in which X'' represents an oxygen atom or a nitrogen atom which may be substituted and R$_9$ represents an aliphatic or aromatic residue. Organic bridging groups represented by Z are those which contain at least one carbon atom in the main chain.

Introduction of the connecting link Z may be carried out as follows:

Linkage through dicarboxylic acid esters may be carried out by known methods, for example, by esterification, especially with azeotropic dehydration, by trans-esterification with elimination of a volatile alcohol or phenol or by reaction with dicarboxylic acid anhydrides or by reaction with dicarboxylic acid halides, in which process the tertiary amino group present in the phenylene residue A may serve as acceptor for the hydrogen halide liberated; in addition to the pure organic acid chlorides, it is also possible to use the phospho-organic alkanephosphoric acid dichlorides, for example, ethane- or cyclohexanephosphoric acid dichloride. To make the dicarbamic acid esters, reac-

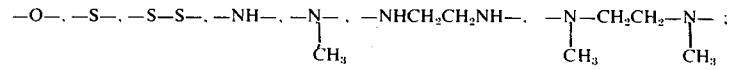

—N(C$_{1-12}$ hydrocarbyl)—, for example —N(C$_{12}$H$_{25}$)— or —N(naphthyl-1)— —O—CH$_2$—CH$_2$—NH—CHtion is further effected with diisocyanates, when the group X is a hydroxyl group, it being preferable to carry out the reaction either in an inert organic solvent or at a moderate temperature in the absence of a solvent; however, it is also possible to use an active solvent.

Included in the class of organic acid chlorides is phosgene, with which the carbonates are obtained; the reaction may be carried out in the following manner; the hydroxyl group of the dyestuff component is first reacted with at least one mol of phosgene to form the chlorocarbonic acid ester and the latter is added on to a diol or an unsubstituted or partially substituted diamine. However, the carbonic acid esters may also be prepared by trans-esterification with dialkyl or diaryl carbonates.

When X is an amino group containing at least one active hydrogen atom, the corresponding dicarboxylic acid amides are obtained, preferably by reaction with dicarboxylic acid halides, and the corresponding phosphoric acid diamides are obtained by reaction with alkanephosphoric acid dichlorides. The corresponding ureas are obtained by reaction with diisocyanates. When the dyestuff component is reacted with an equimolar amount of a bis-chlorocarbonic acid ester, the corresponding bis-carbamic acid ester is obtained.

When Z is the residue of a dicarboxylic acid, the starting materials used, as bifunctional reactants for the group X, are the following free acids, or the halides or anhydrides thereof (provided the acid concerned is capable of forming an anhydride), or the esters thereof formed with volatile alcohols: oxalic acid, succinic acid, malonic acid, pimelic acid, adipic acid, methyladipic acid, azelaic acid, sebacic acid, maleic acid, fumaric acid, allylsuccinic acid, dodecylsuccinic acid, diglycollic acid, methylene-bis-thioglycollic acid, 2,3-dibromosuccinic acid, thiobutyric acid, tetrahydrophthalic acid, hexahydrophthalic acid, endomethylenetetrahydrophthalic acid, methylene-endomethylenetetrahydrophthalic acid, hexachloroendomethylenetetrahydrophthalic acid, phthalic acid, isophthalic acid, terephthalic acid, 2,5-thiophenedicarboxylic acid, furandicarboxylic acid and the dicarboxylic acids of the formulae in which X represents an amino, mercapto or hydroxyl group, are aliphatic, cycloaliphatic, araliphatic, aromatic or heterocyclic diisocyanates. The following may be mentioned as examples: hexamethylenediisocyanate, N,N'-bis-(4-methyl-3-isocyanatophenyl)-urea, cyclohexane-1,4-diisocyanate, 1,2,3,4,5,6-hexahydrodiphenylmethane-4,4'-diisocyanate, and also aromatic diisocyanates, for example, toluene-2,4- or -2,6-diisocyanate or mixtures thereof, phenylene-1,4-diisocyanate, diphenyl-4,4'-diisocyanate, diphenylmethane-4,4'-diisocyanate, diphenyldimethylmethane-4,4'-diisocyanate, stilbene-4,4'-diisocyanate, benzophenone-4,4'-diisocyanate, diphenylether or diphenylsulphide diisocyanate and the substitution products thereof, for example, derivatives substituted by alkyl, alkoxyl, or nitro groups or halogen atoms, for example, 3,3'-dimethyl- or 3,3'-dimethoxy- or 3,3'-dichlorodiphenylmethane-4,4'-diisocyanate. Further examples are diisocyanates of the naphthalene series, for example, naphthylene-1,5-diisocyanate, or heterocyclic diisocyanates, for example, those of benzofuran or urea, and also diisocyanates containing uretdione groups, for example, 1.3-bis(4'-methyl-3'-isocyanato-phenyl)-uretdione.

Symmetrical diisocyanates, for example, diphenyl-4,4'-or diphenylmethane-4,4'-diisocyanate, are preferred.

The diisocyanates may also be manufactured in situ, for example, by reacting a bis-chloromethylbenzene with sodium cyanate or lead cyanate in active solvents.

To manufacture the carbonates when X is a hydroxyl group the reaction may be carried out directly with phosgene, if necessary, in the presence of quaternary ammonium bases or salts, to form the carbonate or, alternatively, the chloroformic acid ester of a styryl dyestuff residue is first prepared and then reacted either with an identical or a different styryl dyestuff residue containing a free hydroxyl group to form the carbonate. On the other hand, 2 mols of the chloroformic acid ester may be reacted with 1 mol of a diol, a diamine or a dithiol to form the diurethane, bis-(thiourethane) or the bis-urea compound, the reaction prefera-

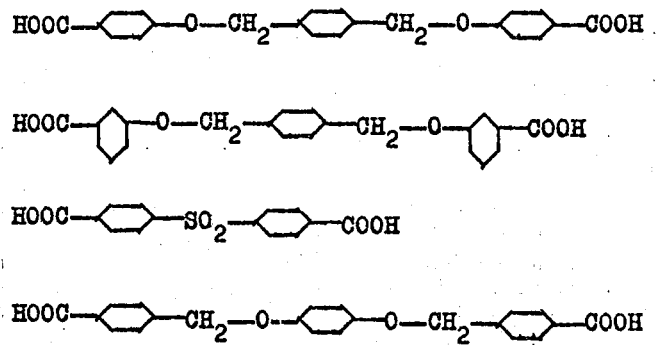

The halides of aliphatic and especially aromatic disulphonic acids are used for linkage with the acyl residue of a disulphonic acid.

Compounds that are suitable as diisocyanate components Z', which form the colourless connecting group Z by reaction with 2 mols of the dyestuff component of the formula

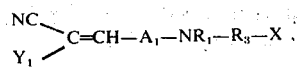

bly being carried out in the presence of a hydrogen chloride acceptor, for example, pyridine.

Suitable divalent aliphatic, cycloaliphatic, araliphatic or aromatic hydroxyl compounds, the hydrocarbon structure of which may be interrupted by hetero atoms, which may be mentioned are as follows: 1,2-dihydroxyethane, 1,2- or 1,3-dihydroxypropane, 1,2-, 1,3-, 1,4- or 2,3-dihydroxybutane, 1,2-, 1,3-, 1,4-, 1,5-, 2,3- or 2,4-dihydroxypentane, the corresponding dihydroxyhexanes, heptanes, octanes, nonanes, decanes, undecanes, dodecanes, hexadecanes and octadecanes, 1,4-dihydroxybutene, 1,5-dihydroxy-2,2-dimethylpentane, di-(β-hydroxyethyl)-thioether, di-(β-hydroxy-ethyl)ether(=diglycol), triglycol, cyclohexanediol-1,2 or -1,3 or -1,4, 4,4'-dihydroxydicyclohexylmethane, 4,4'-dihydroxy-dicyclohexyldimethylmethane, 4-hydroxybenzyl alcohol, 1,4-di-(β-hydroxyethoxy)-benzene, 1,2-, 1,3- or 1,4-dihydroxybenzene, 1-methyl-2,4- (or 2,3-, 3,4-, 2,6-, 2,5- or 3,5-)dihydroxybenzene, 1,4-dimethyl-2,5-dihydroxybenzene, 1-ethyl-2,4-dihydroxybenzene, 1-isopropyl-2,4-dihydroxybenzene, 4,4'-dihydroxyazobenzene, 2,4-or 4,4'-dihydroxydiphenylether, 2,2'-dihydroxyethylene-glycoldiphenylether, 2,6-or 2,7-dihydroxynaphthalene, 4,4'-dihydroxydiphenylamine, 2,6- - or 4,4'-dihydroxydiphenyl, 4,4'-dihydroxydiphenylmethane, 4,4'-dihydroxydiphenyldimethylmethane, 1,1'-di-(4'-hydroxyphenyl)-cyclohexane, 4,4'-dihydroxydiphenyl-(di)-sulphide, 4,4'-dihydroxydiphenylsulphonyl or mixtures of such diols.

Instead of diols it is also possible to use dithiols, especially aliphatic, araliphatic and aromatic dithiols, for example, 1,2-ethanedithiol, 1,3-propanedithiol, 1,6-hexanedithiol, 3,4-toluenedithiol and para-xylenedithiol.

Suitable amines having two primary or secondary nitrogen atoms which may be reacted with 2 mols of the styryl dyestuff chloroformic acid ester of the formula

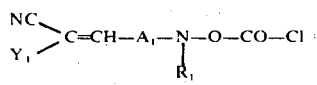

are as follows: 1,2-diaminoethane, 1,2- or 1,3-diaminopropane, 1,2- 1,3-, 1,4- or 2,3-diaminobutane, 1,2-, 1,3-, 1,4-, 1,5-, 2,3- or 2,4-diaminopentane, the corresponding diaminohexanes, heptanes, octanes, nonanes, decanes, undecanes, dodecanes, hexadecanes and octadecanes, 1,4-diaminobutene, 1,5-diamino-2,2-dimethylpentane, di-(β-aminoethyl)-thioether, di(γ-aminopropyl)-ether, butyleneglycoldipropylether- diamine, N,N'-dimethyldiamino-ethane-1,2, N,N'-diethyldiaminoethane-1,2 1-amino-3-methylamino-propane, isophoronediamine, piperazine, N-2-aminoethyl-piperazine, ω, ω'-diamino-1,3- (or -1,4)-dimethylbenzene, ω, ω'-diamino-1,4-(or -1,2)-dimethylcyclohexane, ω, ω'-diamino-1,4-diethylbenzene, ω, ω'-diamino-1,4- (or -1,5)-dimethylnaphthalene, 1,2- 1,3- or 1,4-diaminocyclohexane, 1-methyl-2,4-diaminocyclohexane, 4,4'-diaminodicyclohexylmethane, 4,4'-diaminodicyclohexyldimethyl-methane, 4,4'-diamino-2,2'-dimethyldicyclohexylmethane, 4-amino-benzylamine, 3-(3'- or 4'-aminophenyl)-1-aminopropane, tetra-hydronaphthylenediamine-1,5 or -1,4, hexahydrobenzidine-4,4'-diamine, hexahydrodiphenylmethane-4,4'-diamine, 1,2-, 1,3- or 1,4-diaminobenzene, 1-methyl-2,4- (or 2,3-, 3,4, 2,6-, 2,5- or 3,5- )diaminobenzene, 1,4-dimethyl-2,5-diaminobenzene, 1-isopropyl-2,4-diaminobenzene, diisopropyldiaminobenzene, 1-chloro-2,4-diaminobenzene, 2,4- (or -4,4') -diaminodiphenylether, ethylene-glycoldiphenylether-2,2'-diamine, diethyleneglycoldiphenylether-2,2'-diamine, N-methylphenylenediamine-1,4 2,6- or 2,7-naphthylenediamine, 4,4'-diaminodiphenyl, 3,3'-dimethyl-4,4'-diaminodiphenyl,4,4'-diaminodiphenylmethane, 4,4'-diaminodiphenyldimethylmethane, 3,3'-diaminobenzophenone, 2,4-diaminodiphenylethane-1,2, 4,4'-diamino-2,2', 5,5'-tetramethyltriphenylmethane, fluorenediamine- 2,7,2,6-diaminoanthraquinone, 9-ethylcarbazole-3,6-diamine, chrysene-2,8-diamine, benzidinesulphone-4,4'-diamine, diphenyl-disulphide-4,4'-diamine, diphenylsulphone-4,4'-diamine, diphenyl-methanesulphone-4,4'-diamine, 4,4'-dimethoxy-3,3'-diaminobenzene-thioethyleneglycol and 3,3'-dimethoxy-4,4'-diaminodibenzylsulphone.

In addition to dialcohols, dithiols and diamines, difunctional compounds may also be used which have two different representatives of the functions mentioned.

The introduction of ether bridging groups or the residue —O—R$_5$—O— is effected, for example, by reacting aqueous or alcoholic solutions of alkali phenolates with diahalides. When dichlorides are used as starting materials it is also possible to use, in particular, dihalides having active chlorine atoms. Suitable dihalides are, for example, 1,4-dichlorobutene, di-β-chloroethylether, dichloroethylformaldehyde and the isomers of bis-(chloromethyl)-benzene.

When the dyestuffs of the formulae

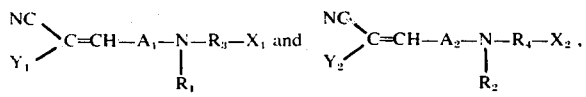

in which $X_1$ and $X_2$ each represents a reactive hydroxyl, thiol, carboxyl or especially an amino group, are reacted with a diepoxide the terminal groups of the bridging component Z are ethyl, thioether, ester or imido bridging groups, a hydroxyl group being formed at the same time in β-position to each of the terminal carbon atoms; this is caused by the opening of the epoxy rings.

A specially preferred method of producing the —R$_3$—Z—R$_4$—group consists in the bilateral linking of styryl dyestuffs of the formulae

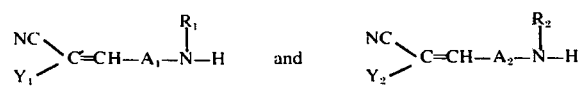

which contain at least one active hydrogen atom attached to the nitrogen atom which governs coupling or para-aminophenyl residues of the formulae H—A$_1$—N-H—R$_1$ and H—A$_2$—NH—R$_2$ with a diepoxide compound, for example, a compound of the kind commercially available as used in epoxy resin chemistry. When a diglycidyl compound is used, a compound is obtained in which the symbols of the group —R$_3$—Z—R$_4$— have the following meanings: $R_3$ and $R_4$ are propylene groups which contain a hydroxyl group in β-position to the nitrogen at in para-position and Z is the residue of a diglycidyl compound freed from the glycidyl groups.

When the starting materials used are cycloliphatic epoxy compounds described below in which the epoxy oxygen atoms are directly bound to a cycloaliphatic ring, the alkylene residues $R_3$ and $R_4$ in the group —R$_3$—Z—R$_4$— are components of an alicyclic ring system and they again contain the hydroxyl group formed by opening of the epoxy ring and which is in β-position to the nitrogen atom in para-position.

Accordingly, the preferred compounds of the invention are bisstyryl dyestuffs of the formula (1) in which the group —$R_3$—Z—$R_4$— is produced by the addition of a diepoxide to two coupling components or azo dyestuff residues containing at least one active hydrogen atom attached to the nitrogen atom which governs coupling.

The reaction of amino groups situated at the aromatic nucleus constitutes one of the fundamental reactions in epoxy resin chemistry and has thus been studied in all its aspects, for example, in the works of Lee and Neville, "Epoxy Resins", New York, 1957 and 1967, and Houben-Weyl, "Methoden der organischen Chemie", Vol. 14, Part 2, Stuttgard, 1963, pages 462 to 567; reaction with other functional groups and the diepoxides customarily used in epoxy resin technology have also been described.

The reaction between epoxide groups and amino groups may actually be carried out at room temperature, although when the amino groups are in the aromatic nucleus, the reaction is carried out at a temperature within the range of from 30° to 150°C.

The reaction proceeds in a manner such that the two epoxide groups of the formula

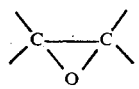

react with the free hydrogen atom of the amine of the group of the formula —H—NR— to form the β-hydroxyamine of the formula

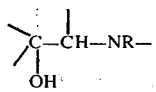

R representing one of the residues $R_1$ or $R_2$. The hydroxyl groups formed by the opening of the 1,2-epoxide rings may subsequently be substituted, especially acylated; together with the ethylene bridging group leading to the nitrogen atom in para-position in the formula depicted above, they may have the same substituents, for example the alkyl groups $R_1$ and $R_2$, which are derivatives of an N-β-hydroxyethyl group, but especially the residues of aliphatic carboxylic acids, for example, acetic acid, propionic acid and so forth, the residues of aromatic carboxylic acids, for example, benzoic acid, and alkyl- or arylcarbamyl residues, for example, ethylcarbamyl or phenylcarbamyl residues.

Bisstyryl dyestuffs, which are derivatives of an N,N-diglycidylalkylamino as middle component —$R_3$—Z—$R_4$—, for example, N,N-diglycidylpropylamino, may also be obtained by reacting an alkylamine with twice the molar amount of a styryl dyestuff of the general formula

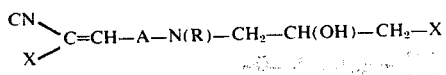

in which X represents a labile negative residue, especially a halogen atom, or by reacting together equivalent amounts of a dyestuff of the formula

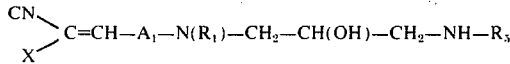

and the dyestuff of the formula

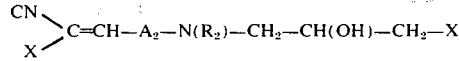

in which X has the meaning given above, and either before or afterwards, condensing a fourth group $R_6$ at the quaternated nitrogen atom with an alkylating agent $R_6$-X, X being an easily eliminable negative residue customary in alkylation reactions, especially a chlorine, a bromine or an iodine atom.

It is preferable to use bifunctional compounds having two terminal epoxide groups which correspond to the members of the epoxy resin class, for example, butadiene-diepoxide, the diglycidyl ethers of dihydric alcohols, for example, glycol-diglycidylether, the diglycidyl ethers of dihydric phenols, for example, 4,4'-dihydroxydiphenylmethane, -dimethylmethane or -sulphone, the diglycidyl ethers derived from polyhydric thiols, for example, bis-(mercaptomethyl)-benzenes the N,N'-diglycidyl compounds, for example, of N,N'-dimethyl-4,4'-diaminodiphenylmethane, ethylene-urea or oxamide, and the diglycidyl esters of aliphatic, cycloaliphatic or aromatic dicarboxylic acids, for example, phthalic acid, hexahydrophthalic acid, tetrahydrophthalic acid or succinic acid.

The dialdehydes of the formula

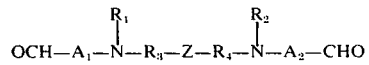

in which $A_1$, $A_2$, $R_1$, $R_2$, $R_3$, $R_4$ and Z have the meanings ascribed to them in formula (1) may advantageously be obtained by condensing a diamine of the formula

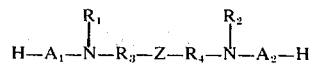

with dimethylformamide and phospshorus oxychloride according to Vilsmeyer and hydrolysing the intermediate product obtained.

The starting materials used are preferably the dialdehydes of the given formula in which Z represents an oxygen atom or a sulphur atom, an imino group or one of the following groups: —COO—, OCOO—, —S—S—, —O—$R_5$—O—, —NH—$R_5$—NH—, —OCONH—$R_5$—NHCOO—, —CONH—$R_5$—NHCO—, —NHCO—$R_5$—CONH—, in which $R_5$ represents an alkylene or a phenylene group which may be substituted, but especially dialdehydes in which at least one acyl group is present in the group represented by Z or in which the group Z is formed by reacting 2 mols of an aromatic amine with 1 mol of diepoxide.

The following dialdehydes are examples:

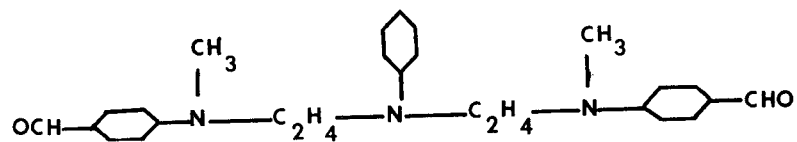
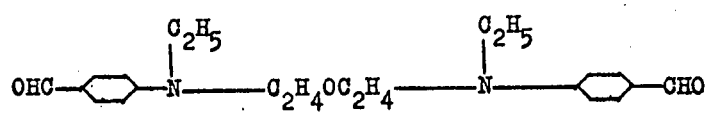
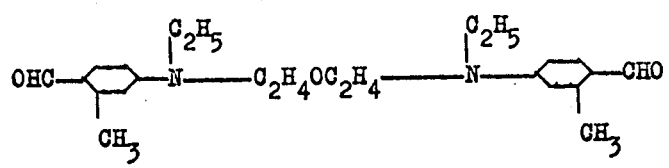
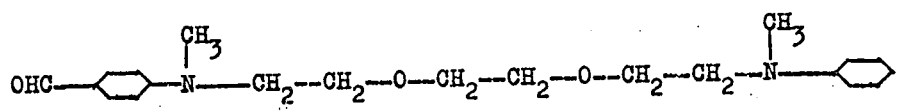
and also the dialdehydes of the formula
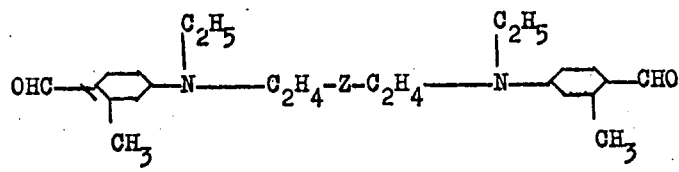
in which Z represents the following:
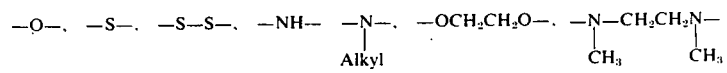
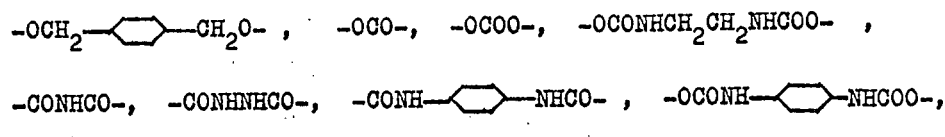
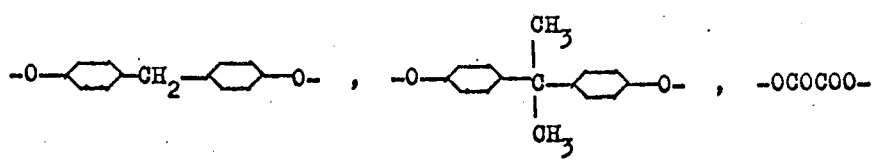
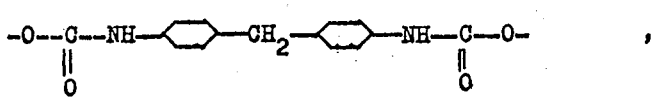

—O—C—NH—(CH$_2$)$_3$—NH—C—O—  and  —NHCOCONH—
 ‖                       ‖
 O                       O
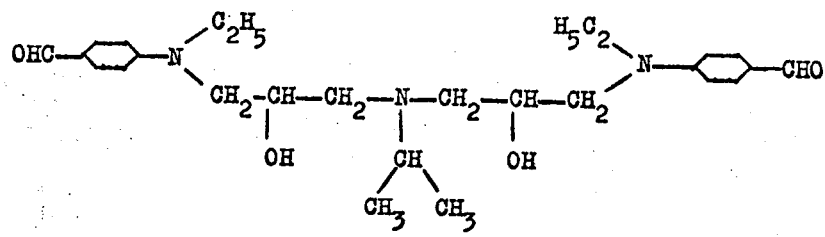
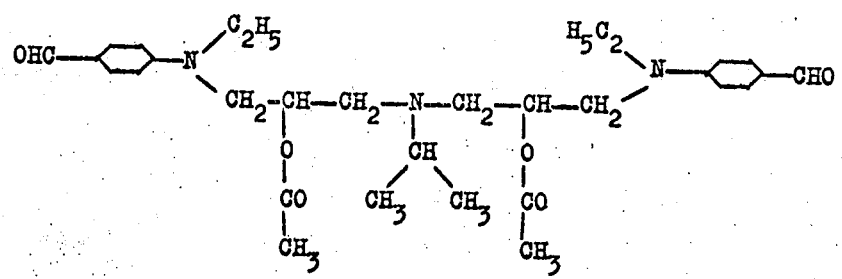
and the dialdehydes of the formula
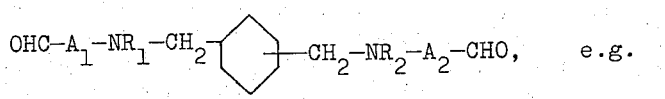
and the formula
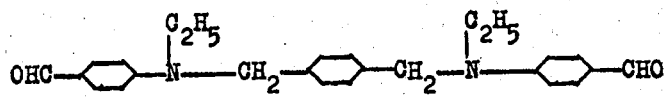
the nitrogen atom which governs coupling are the following:
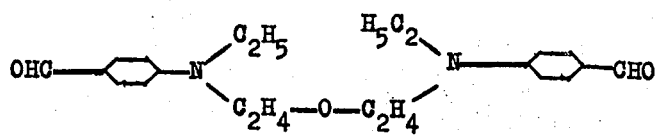
Suitable dialdehydes which contain a secondary hydroxyl group, which may be acylated, in β-position to
Suitable dialdehydes which contain at least one acyl group in the bridging component are the following:
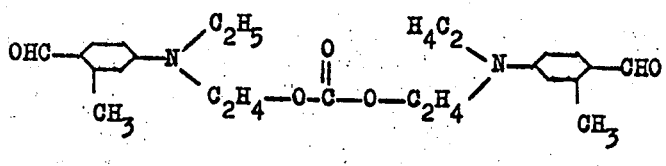

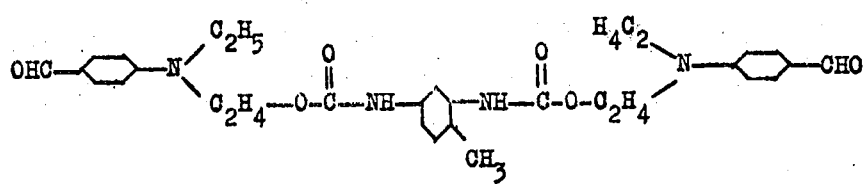

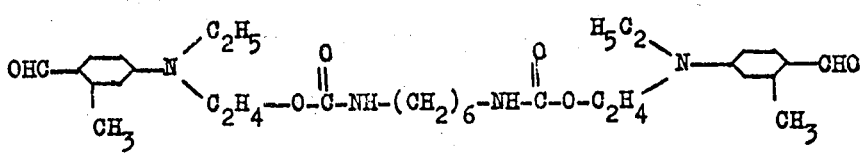

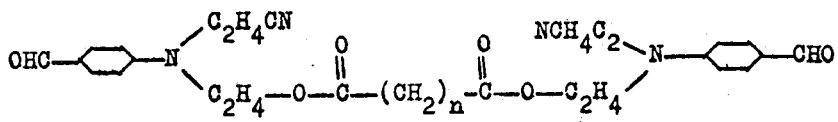

(n=2–8)

Cyano compounds of the formula NC—CH$_2$—X which may be mentioned are malonitrile, cyanoacetic acid, methyl-, -ethyl-, -propyl-, isobutyl- or β-cyanoethyl-ester, cyanoacetamide and phenylsulphonylacetonitrile.

Condensation of the dialdehydes with cyano compound is advantageously carried out with the application of heat in the presence of a basic catalyst, for example, ammonia, dimethylamine, diethylamine, piperidine, piperidine acetate, sodium alcoholate or potassium alcoholate, if necessary, in the presence of a solvent, for example, methanol, ethanol, benzene, toluene, xylene, chloroform or carbon tetrachloride. When using solvents, the water formed during the reaction can be removed continuously from the reaction mixture by azeotropic distillation of the solvent, whereby the reaction equilibrium is shifted constantly in favour of the condensation product. Condensation may also be effected without a basic catalyst in glacial acetic acid or in some other organic acid, or in the absence of a solvent by fusing the reactants in the presence of a basic catalyst, for example, ammonium acetate or piperidine acetate.

The aldehydes can be replaced by the aldimines thereof, that is to say, the condensation products obtained with primary amines, especially aminobenzenes, in other words, the so-called Schiff's bases of the formula (4)  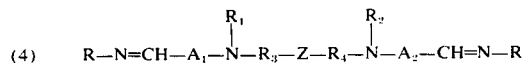

in which R preferably represents a benzene residue, for example, a phenyl or a sulphophenyl residue. The compounds of formula (4) may be obtained by condensing the product obtained by reacting formaldehyde and hydrochloric acid with an amine of formula (3) with a nitrobenzene, for example, a nitrobenzenesulphonic acid, in the presence of iron and hydrochloric acid in accordance with Example 17 of U.S. Pat. No. 2,583,551.

The preferred starting materials are the new dialdehydes of the formula

OCH—A$_1$—NR$_1$—R$_3$—Z$_2$—R$_4$—NR$_2$—A$_2$—CHO in which R$_1$ and R$_2$ each represents a hydrogen atom or preferably an alkyl group having at least two carbon atoms, R$_3$ and R$_4$ each represents an alkylene group having at least 2 carbon atoms, Z$_2$ represents an oxygen atom, an imino group or a divalent organic residue and H—A$_1$ and A$_2$—H— represent para-phenylene residues. Suitable organic groups represented by Z$_2$ are, for example, those which contain at least one, but preferably two, acyl groups in the main chain, which joins the residues R$_1$ and R$_2$, or those which contain the residue of a diepoxy compound, the residues R$_3$ and R$_4$ being N-β-hydroxyethyl or -propyl residues formed by cleavage of the epoxide rings.

The dialdehydes containing acyl groups may be obtained when the acylation processes described above are carried out with bifunctional compounds, but using, instead of a dyestuff component, the corresponding amine of the formula

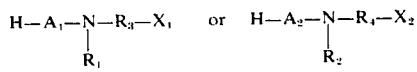

in which H—A$_1$, H—A$_2$, R$_1$, R$_2$, R$_3$ and R$_4$ have the meanings given above and X$_1$ and X$_2$ each represents a group containing at least one reactive hydrogen atom, preferably an amino, mercapto or hydroxyl group, and subsequently carrying out the Vilsmeyer reaction. The other dialdehydes may be obtained in an analogous manner by means of the reactions described above.

The new dyestuffs are eminently suitable for dyeing and printing hydrophobic man-made fibres, for example, fibres made from cellulose acetate, but especially fibres made from aromatic polyesters, particularly after conversion into a finely divided state, for example, by grinding, pasting, reprecipitation and so forth. The new dyestuffs can also be used for dyeing hydrophobic fibres made from copolymers derived from propylene oxide and unsaturated epoxides and fibres based on polyvinyl chloride.

They produce pure, strong, greenish yellow dyeings possessing excellent fastness to light and sublimation on the said hydrophobic fibres, especially on polyester fibres, when applied by the customary dyeing processes, for example, when applied in a dyebath containing a fine dispersion of dyestuff and advantageously a dispersing agent at a temperature close to 100°C, if necessary, in the presence of a sweling agent, or at a temperature above 100°C under superatmospheric pressure. The new dyestuffs also have the advantage that they only very slightly stain wool and other fibres that may be present in the dyebath. They are therefore very suitable for dyeing union fabrics made from a mixture of polyester fibre and wool or, for example, a mixture of polyester fibre and cellulose, triacetate.

The dyestuffs of the invention are also suitable for application by the so-called Thermosol process in which the fabric to be dyed is impregnated at a temperature not exceeding 60°C with an aqueous dispersion of the dyestuff which advantageously contains 1 to 50% of urea and a thickening agent, especially sodium alginate, and is then squeezed in the usual manner, advantageously so as to retain 50 to 100% of dyeliquor, based on the dry weight of the goods. To fix the dyestuff, the material so impregnated is heated to a temperature above 100°C, for example, to a temperature between 180° and 210°C, advantageously after drying, for example, in a current of warm air.

The Thermosol process described above is specially suitable for the dyeing of union fabrics made from polyester and cellulosic fibres, especially cotton. When used for this purpose, the padding liquor contains dyestuffs suitable for dyeing cotton, for example, vat dyestuffs, in addition to the dyestuffs of the invention. When vat dyestuffs are used, the padded fabric must be treated with an aqueous alkaline solution of one of the reducing agents customarily used in vat dyeing subsequent to the heat treatment.

Some of the new colourants are also valuable pigments which may be used for a very wide variety of purposes. For example, they may be used in a state of fine division for the spin-colouration of filament and staple-fibre viscoe, cellulose ether, cellulose ester, polyamides, polyurethanes and polyesters, and also in the production of coloured lacquers and lake-formers, solutions or products made from cellulose acetate, nitrocellulose, natural or synthetic resins, for example, polymerization resins or condensation resins, for example, aminoplasts, alkyd resins, phenoplasts and polyolefines, for example, polystyrene, polyvinyl chloride, polyethylene, polypropylene, polyacrylonitrile, rubber, casein, silicones and silicone resins.

The following Examples illustrate the invention. Unless otherwise stated, the parts and percentages are by weight.

EXAMPLE 1

48.8 Parts of N-ethyl-N-($\beta$-hydroxyethyl)-meta-toluidine are heated for 15 hours under reflux in 30 parts by volume of anhydrous benzene in the presence of 11 parts of metallic sodium. The excess of sodium is removed and subsequently 53.8 parts of N-ethyl-N-($\beta$-chloroethyl)-meta-toluidine in 50 parts by volume of anhydrous benzene and 4 parts of sodium iodide are added. The mixture is heated for a considerable time under reflux while stirring and it is then diluted with anhydrous benzene. The sodium chloride and sodium iodide which form are removed by filtration and the filtrate is concentrated and distilled. It boils at a temperature between 185° and 195°C under a pressure of 0.1 mm Hg. The amine so obtained corresponds to the formula

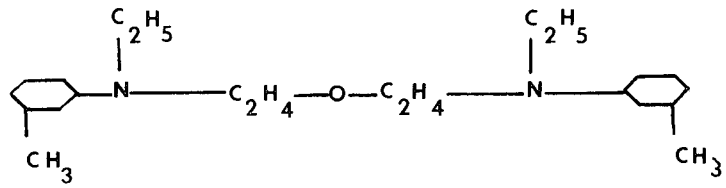

Analysis: Calculated: C 77.6% H 9.5% N 8.2%
Found: C 77.9% H 9.7% N 8.3%

The same amine can also be obtained by reacting 2,2'-dichlorodiethylether with N-ethyl-meta-toluidine.

10.2 Parts of this amine are introduced at 15°C into a mixture of 11.1 parts by volume of dimethylformamide and 9.4 parts by volume of phosphorus oxychloride while stirring and the batch is stirred for 6 hours at 60°C. The reaction product is discharged on to ice, chloroform is added and the mixture is neutralized at room temperature with concentrated sodium hydroxide solution while adding ice. The chloroform phase is washed once with water and then dried with $Na_2SO_4$. The chloroform is distilled and the crude dialdehyde of the formula

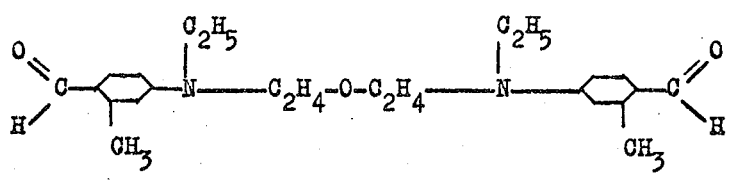

remains as a dark oil.

1.6 Parts of malodinitrile and 0.2 part by volume of piperidine are added to 4 parts of this dialdehyde in 25 parts by volume of absolute alcohol and the batch is heated for 5 hours under reflux. When cooled to room temperature, a dark oil is obtained which crystallizes when allowed to stand. After recrystallization, the fine, orange-yellow crystals of the dyestuff of the formula

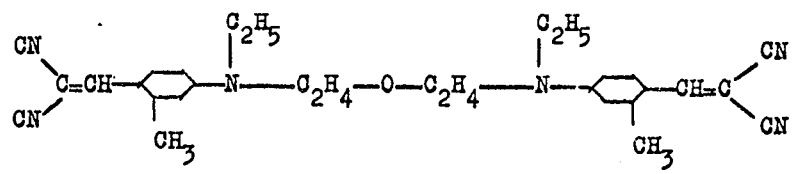

are obtained. Analysis: N calculated: 17.1% N found: 17.1%.

It dyes polyester fibres pure, greenish yellow shades possessing excellent fastness to light and sublimation.

EXAMPLE 2

When the dialdehyde of the formula

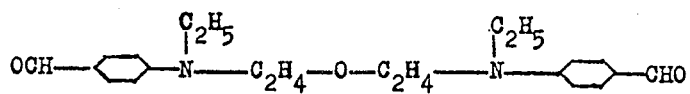

is used as starting material and the procedure described in Example 1 is followed, a dyestuff is obtained which also dyes polyester fibres greenish yellow shades possessing very good fastness to light and sublimation.

EXAMPLE 3

4 Parts of the dialdehyde described in Example 1 are heated under reflux for 4 hours in 25 parts by volume of ethanol together with 2.4 parts of cyanoethyl acetate and 0.2 part of piperidine. When the batch is cooled 3.5 parts of the dyestuff of the formula

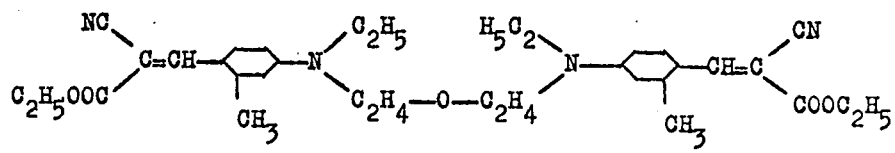

Dyeing procedure

1 Part of the dyestuff obtained in the manner described in Example 1 is ground wet with 2 parts of a 50% aqueous solution of the sodium salt of dinaphthylmethanedisulphonic acid and the batch is dried.

The dyestuff preparation so obtained is mixed with 40 parts of a 10% aqueous solution of the sodium salt of N-benzyl-μ-heptadecyl-benzimidazoledisulphonic acid and then 4 parts of 40% acetic acid solution are added. A dyebath of 4,000 parts is prepared therefrom by dilution with water.

100 Parts of cleaned polyester fibre material are entered into this dyebath at 50°C, the temperature is raised to 120° to 130°C within 30 minutes and dyeing is carried out for one hour at that temperature in a closed vessel. The material is then well rinsed. A greenish yellow dyeing possessing excellent fastness to light and sublimation is obtained.

are obtained in the form of an orange powder.

It dyes polyester materials greenish yellow shades possessing good properties of fastness.

Table 1 below enumerates further valuable dyestuffs of the general formula

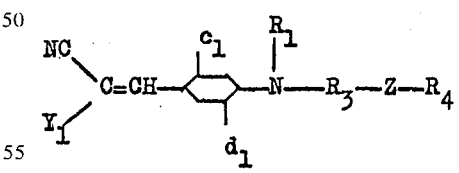

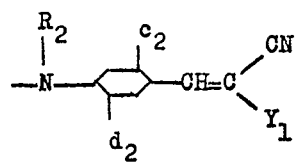

which may be obtained in a manner analogous to that described in Example 1.

41.3 Grams of $\beta,\beta'$-dihydroxy-$\gamma,\gamma'$-di-(N-phenyl-N-ethyl-) aminotripropylamine and 25 grams of acetic

| Example | $R_1$ | $R_2$ | $R_3$ | $R_4$ | $c_1$ | $d_1$ | $c_2$ | $d_2$ |
|---|---|---|---|---|---|---|---|---|
| 1 | $-CH_3$ | $-C_2H_5$ | $-C_2H_4-$ | $-C_2H_4-$ | $-CH_3$ | $-H$ | $-CH_3$ | $-H$ |
| 2 | $-CH_2-C_6H_5$ | $-CH_2-C_6H_5$ | $-C_2H_4-$ | $-C_2H_4-$ | $-H$ | $-H$ | $-H$ | $-H$ |
| 3 | $-C_2H_5$ | $-C_2H_5$ | $-C_2H_4-$ | $-C_2H_4-$ | $-CH_3$ | $-H$ | $-CH_3$ | $-H$ |
| 4 | $-C_2H_5$ | $-C_2H_5$ | $-C_2H_4-$ | $-C_2H_4-$ | $-CH_3$ | $-H$ | $-CH_3$ | $-H$ |
| 5 | $-C_2H_4OCOCH_3$ | $-C_2H_4OCOCH_3$ | $-C_2H_4-$ | $-C_2H_4-$ | $-H$ | $-OCH_3$ | $-H$ | $-OCH_3$ |
| 6 | $-C_2H_5$ | $-C_2H_5$ | $-C_2H_4-$ | $-C_2H_4-$ | $-H$ | $-H$ | $-H$ | $-H$ |
| 7 | $-C_2H_5$ | $-C_2H_5$ | $-C_2H_4$ | $-C_2H_4-$ | $-H$ | $-H$ | $-H$ | $-H$ |
| 8 | $-C_2H_4OCH_3$ | $-C_2H_4OCH_3$ | $-C_2H_4-$ | $-C_2H_4-$ | $-H$ | $-H$ | $-H$ | $-H$ |
| 9 | $-C_2H_5$ | $-C_2H_5$ | $-CH_2-CH(OCOCH_3)-CH_2-$ | $-C_2H_4-$ | $-H$ | $-H$ | $-H$ | $-$ |
| 10 | $-C_2H_5$ | $-C_2H_5$ | $-C_2H_4$ | $-C_2H_4-$ | $-Cl$ | $-H$ | $-Cl$ | $-H$ |
| 11 | $-C_2H_5$ | $-C_2H_5$ | $-CH_2-CH(OCONHC_2H_5)-CH_2$ | $-C_2H_4-$ | $-H$ | $-H$ | $-H$ | $-Hm$ |

| Example | $Y_1$ | $Y_2$ | Z | Shade |
|---|---|---|---|---|
| 1 | $-CN$ | $-CN$ | $-O-$ | greenish yellow |
| 2 | $-CN$ | $-CN$ | $-O-$ | greenish yellow |
| 3 | $-CN$ | $-CN$ | $-O-C_2H_4-O-$ | greenish yellow |
| 4 | $-CONH_2$ | $-CONH_2$ | $-O-$ | greenish yellow |
| 5 | $-CN$ | $-CN$ | $-O-$ | greenish yellow |
| 6 | $-SO_2-C_6H_5$ | $-SO_2-C_6H_5$ | $-O-$ | greenish yellow |
| 7 | $-CN$ | $-CN$ | $-O-C_6H_4-C(CH_3)_2-C_6H_4-O-$ | greenish yellow |
| 8 | $-CN$ | $-CN$ | $-O-$ | greenish yellow |
| 9 | $-CN$ | $-CN$ | $-O-$ | greenish yellow |
| 10 | $-CN$ | $-CN$ | $-O-$ | greenish yellow |
| 11 | $-CN$ | $-CN$ | $-O-$ | greenish yellow |

EXAMPLE 4

30 Grams of N-ethylaniline, 17.1 grams of $\beta,\gamma,\beta',\gamma'$-diepoxytripropylamine (prepared in accordance with French Pat. No. 1,137,175) and 30 grams of chlorobenzene are heated for 24 hours at approximately 140°C; the solvent is then removed in vacuo and the residue is distilled in a high vacuum. $\beta,\beta'$-Dihydroxy-$\gamma,\gamma'$-di-(N-phenyl-N-ethyl-) aminotripropylamine is obtained.

Calculated: C 72.60% H 9.51% N 10.16% Found: C 72.3% H 9.7% N 10.2% anhydride are heated for 3 hours at 130°C; the glacial acetic acid which forms is removed in vacuo and the residue is distilled in a high vacuum. $\beta,\beta'$-Diacetoxy-$\gamma,\gamma'$-di-(N-phenyl-N-ethyl-)aminotripropylamine is obtained:

Calculated: C 69.99% H 8.71% N 8.44% Found: C 69.6% H 8.8% N 8.6%

When this amine is formylated according to Vilsmeier and the dialdehyde is condensed with malodinitrile in a manner analogous to that described in Example 1, the bis-styryl dyestuff of the formula

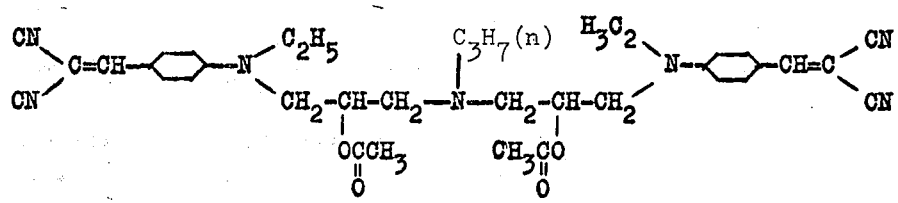

is obtained. It dyes cellulose acetate, polyester and polyacrylonitrile materials greenish yellow shades. The dialdehyde may also be obtained by the process described in the Examples of published German Pat. No. 1,206,879.

Dyeing procedure

1 Part of the dyestuff obtained in the manner described above is dissolved in 5,000 parts of water in the presence of 2 parts of 40% acetic acid. 100 Parts of dried polyacrylonitrile staple fibre yarn are entered into this dyebath at 60°C, the temperature is raised to 100°C within 30 minutes and dyeing is carried out for one hour at the boil. The yarn is then well rinsed and dried. An orange dyeing possessing very good fastness to light, sublimation and washing is obtained.

EXAMPLE 5

30 Grams of N-ethylaniline, 20.2 grams of butanediol-diglycidyl ether and 50 grams of chlorobenzene are heated for 24 hours at about 140°C, the solvent is removed in vacuo and the residue is distilled in a high vacuum. Butanediol-di-[β-hydroxy-γ-(N-phenyl-N-ethyl-)amino-]propyl ether is obtained.

Calculated: C 70.23% H 9.07% N 6.30% Found: C 70.0% H 8.9% N 6.3%

44.4 Grams of butanediol-di-[β-hydroxy-γ-(N-phenyl-N-ethyl-)amino-]propyl ether and 25 grams of acetic anhydride are heated for 3 hours at 130°C and the glacial acetic acid which forms is removed in vacuo. Butanediol-di-[β-acetoxy-γ-(N-phenyl-N-ethyl-)amino-]propyl ether is obtained. The residue may be used as it is or it can be distilled in a high vacuum.

When this amine is formylated and the dialdehyde is condensed with malonic acid dinitrile in a manner analogous to that described in Example 1, the bis-styryl dyestuff of the formula

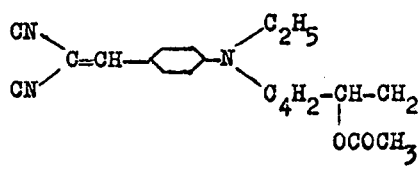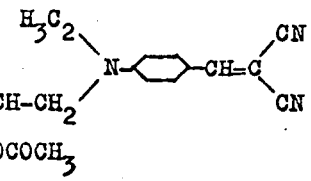

is obtained.

Table II below indicates further valuable dyestuffs which dye polyester fibres greenish yellow shades and which may be obtained by processes analogous to those described in Examples 4 and 5. The substituents and indices have the meanings given above.

| | $R_1$ | $R_2$ | $R_3$ | $R_4$ |
|---|---|---|---|---|
| 1 | $-C_2H_4OCCH_3$ (O) | $-C_2H_4OCCH_3$ (O) | $-CH_2-CH(OCOCH_3)-CH_2-$ | $-CH_2-CH(OCOCH_3)-CH_2-$ |
| 2 | $-C_2H_4OCH_3$ | $-C_2H_4OCH_3$ | $-CH_2-CH(OCH_3)-CH_2-$ | $-CH_2-CH(OCH_3)-CH_2-$ |
| 3 | $-C_2H_5$ | $-C_2H_5$ | $-CH_2-CH(OCONHC_2H_5)-CH_2-$ | $-CH_2-CH(OCONHC_2H_5)-$ |
| 4 | $-C_2H_4CN$ | $-C_2H_4-CN$ | $-CH_2-CH(OCOCH_3)-CH_2-$ | $-CH_2-CH(OCOCH_3)-CH_2-$ |
| 5 | $-C_2H_5$ | $-C_2H_5$ | $-CH_2CH(OCOCH_3)CH_2-$ | $-CH_2CH(OCOCH_3)CH_2-$ |
| 6 | $-CH_3$ | $-CH_3$ | $-CH_2CH(OCOCH_3)CH_2-$ | $-CH_2CH(OCOCH_3)CH_2-$ |
| 7 | $-C_2H_4OCNHC_2H_5$ (O) | $-C_2H_4OCNHC_2H_5$ (O) | $-CH_2CH(OCONHC_2H_5)CH_2-$ | $-CH_2CH(OCONHC_2H_5)CH_2-$ |
| 8 | $-C_2H_4CN$ | $-C_2H_4CN$ | $-CH_2CH(OCOCH_3)CH_2-$ | $-CH_2CH(OCOCH_3)CH_2-$ |
| 9 | $-C_2H_4-Cl$ | $-C_2H_4-Cl$ | $-CH_2CH(OCOCH_3)CH_2-$ | $-CH_2CH(OCOCH_3)CH_2-$ |
| 10 | $-C_3H_6-NH-COCH_3$ | $-C_3H_6-NH-COCH_3$ | $-CH_2CH(OCOCH_3)CH_2-$ | $-CH_2CH(OCOCH_3)CH_2-$ |
| 11 | $-C_2H_4-O-CO-O-C_2H_5$ | $-C_2H_4-O-CO-O-C_2H_5$ | $-CH_2CH(OCOCH_3)CH_2-$ | $-CH_2CH(OCOCH_3)CH_2-$ |
| 12 | $-C_2H_4-O-CO-O-C_6H_5$ | $-C_2H_4-O-CO-O-C_6H_5$ | $-CH_2CH(OCOCH_3)CH_2-$ | $-CH_2CH(OCOCH_3)CH_2-$ |
| 13 | $-C_2H_4-O-CO-C_6H_4-OCH_3(-p)$ | $-C_2H_4-O-CO-C_6H_4-OCH_3(-p)$ | $-CH_2CH(OCOCH_3)CH_2-$ | $-CH_2CH(OCOCH_3)CH_2-$ |

-continued

| | $R_1$ | $R_2$ | $R_3$ | $R_4$ |
|---|---|---|---|---|
| 14 | —C₂H₄—O—CO—C₆H₄—CO— <br> └—O—C₂H₅(—p) | ($R_1 = R_2$) | —CH₂CHCH₂— <br> \|<br>ȮCOCH₃ | —CH₂CHCH₂— <br> \|<br>ȮCOCH₃ |
| 15 | —C₂H₄—O—CO—NH—C₆H₅ | —C₂H₄—O—CO—NH—C₆H₅ | —CH₂CHCH₂— <br> \|<br>ȮCOCH₃ | —CH₂CHCH₂— <br> \|<br>ȮCOCH₃ |
| 16 | —C₂H₅ | —C₂H₅ | —CH₂CHCH₂— <br> \|<br>ȮCOCH₃ | —CH₂CHCH₂— <br> \|<br>ȮCOCH₃ |
| 17 | —C₂H₅ | —C₂H₅ | —CH₂CHCH₂— <br> \|<br>ȮCOCH₃ | —CH₂CHCH₂— <br> \|<br>ȮCOCH₃ |

| $c_1$ | $d_1$ | $c_2$ | $d_2$ | $Y_1$ | $Y_2$ | Z | Shade |
|---|---|---|---|---|---|---|---|
| —H | —H | —H | —H | —CN | —CN | —N— <br> \|<br>C₃H₇ | greenish yellow |
| —CH₃ | —CH₃ | —CH₃ | —H | —CN | —CN | —O—(CH₂)₄—O— | greenish yellow |
| —OCH₃ | —OCH₃ | —OCH₃ | —OCH₃ | —CN | —CN | —O—(CH₂)₄—O— | greenish yellow |
| —CH₃ | —H | —CH₃ | —H | —CN | —CN | —N—〈⌬〉—CH₃ | greenish yellow |
| —CH₃ | —H | —CH₃ | —H | Carbethoxy | Carbethoxy | —O—〈⌬〉—O— | |
| —H | —H | —H | —H | —CN | —CN | —O—〈⌬〉—C(CH₃)₂—〈⌬〉—O— | |
| —H | —H | —H | —H | —CN | —CN | —O—〈⌬〉—O— | |
| —H | —H | —H | —H | —CN | —CN | —O—(CH₂)₄—O— | |
| —H | —H | —H | —H | —CN | —CN | —O—(CH₂)₄—O— | |
| —H | —H | —H | —H | —CN | —CN | —O—(CH₂)₄—O— | |
| —H | —H | —H | —H | —CN | —CN | —O—(CH₂)₄—O— | |
| —H | —H | —H | —H | —CN | —CN | —O—(CH₂)₄—O— | |
| —H | —H | —H | —H | —CN | —CN | —O—(CH₂)₄—O— | |
| —H | —H | —H | —H | —CN | —CN | —O—(CH₂)₄—O— | |
| —H | —H | —H | —H | —CN | —CN | —O—(CH₂)₄—O— | |
| —CH₃ | —H | —CH₃ | —H | —CN | —CN | —O—CO—〈cyclohexyl〉—CO—O— | |
| —CH₃ | —H | —CH₃ | —H | —CN | —CN | —O—CO—CH〈bicyclic〉CH—CO—O— | |

EXAMPLE 6

73 Parts of adipic acid are converted into adipic acid chloride with 168 parts of SOCl₂, the excess of SOCl₂ is removed in vacuo and the acid chloride is dissolved in 250 parts by volume of benzene. A solution of 176 parts of N—ethyl—N—β—hydroxyethyl-meta-toluidine is added dropwise to the solution within one hour and the batch is heated for 2 hours under reflux while stirring. After cooling, the hydrochloride which precipitates is isolated by suction filtration and washed with benzene: it is then dried in a vacuum cabinet at 50°C. The product is suspended in water and the pH of the suspension is adjusted to 8 with sodium hydroxide solution. The suspension is then suction filtered and the residue is washed well with water. After drying, 215 parts (92%) of the product of the formula

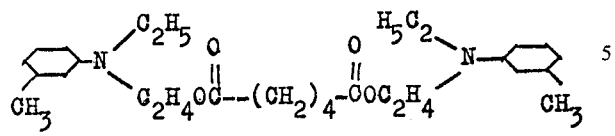

are obtained.

150 Parts of this product are dissolved in 190 parts by volume of dimethylformamide; 109 parts by volume of phosphorus oxychloride are added dropwise to this solution at 15° to 20°C while stirring, the batch is stirred for one hour at 95°C and then discharged, while hot, into 2,500 parts of iced water while stirring. An emulsion first forms from which a greasy product precipitates after some time, which product gradually becomes completely hard. It is suspended in water, the suspension is suction filtered and the filter residue is washed with water until the washings run neutral. The residue is dried in a vacuum cabinet at 60° to 70°C and 146.2 parts (88%) of the dialdehyde of the formula

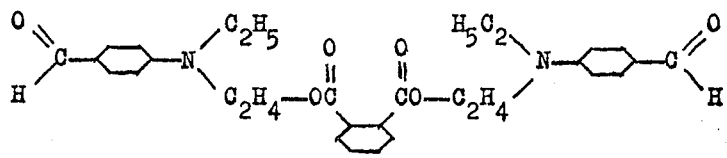

are obtained.

Analysis: Calculated: C 58.6% H 7.7% N 5.3%
Found: C 58.0% H 7.7% N 5.6%

28 Parts of this dialdehyde, together with 7.4 parts of malonic acid dinitrile and 15 drops of piperidine, are heated for 3 hours in 300 parts by volume of isopropanol at a bath temperature of 95°C while stirring. The batch is slowly cooled to room temperature while stirring; after 4 hours it is again heated for 1 hour in a bath having a temperature of 95°C, whereupon it is cooled, the orange precipitate which forms is isolated by suction filtration and washed with a small amount of isopropanol. After drying at 60° to 70°C, 31.4 parts (95.5%) of the dyestuff of the formula

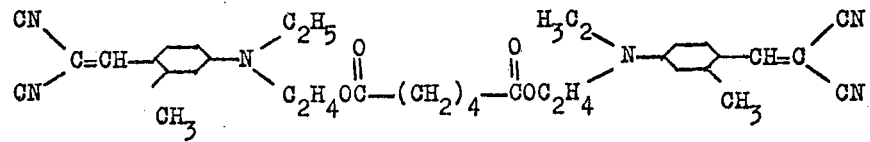

are obtained. It dyes cellulose acetate and polyester materials brilliant, greenish yellow shades possessing excellent fastness to light and sublimation.

EXAMPLE 7

The dialdehyde of the formula

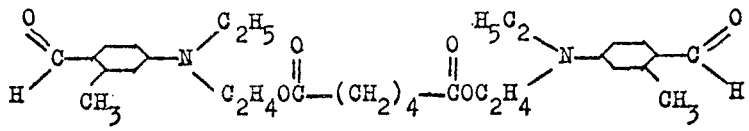

was prepared by a process analogous to that described in Example 6.

This compound was condensed with a mixture of one mol-equivalent each of malonic acid dinitrile and cyanoethyl acetate in methanol with a catalytic amount of piperidine, the main product obtained being the dyestuff of the formula

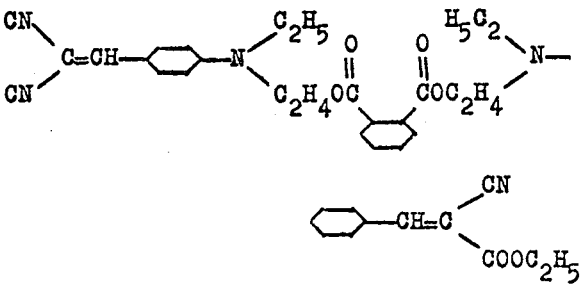

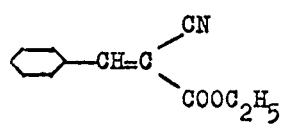

in the form of an olive powder. It also dyes cellulose acetate and polyester materials greenish yellow shades having excellent properties of fastness.

Table III below gives components that may be used for the manufacture of further valuable bis-styryl dyestuffs. Manufacture is effected by esterifying 2 mols of the N-β-hydroxyethylamines listed in Column II with 1 mol of the dicarboxylic acid chlorides listed in Column II, formylating according to Vilsmeier and condensing the dialdehydes obtained with 2 mols of a compound $CN-CH_2-Y(Y_1=Y_2)$, the process being analogous to that described in Example 6.

Table III

| | II | III | Y $(Y_1=Y_2)$ | Shade |
|---|---|---|---|---|
| 1 | N-ethyl-N-β-hydroxyethyl-aniline | succinic acid dichloride | —CN | greenish yellow |
| 2 | N-butyl-N-β-hydroxyethyl-aniline | terephthalic acid dichloride | —CN | greenish yellow |
| 3 | N-ethyl-N-β-hydroxyethyl-3-methyl-aniline | terephthalic acid dichloride | —CN | greenish yellow |
| 4 | N-ethyl-N-β-hydroxyethyl- | phthalic acid dichloride | —CN | greenish yellow |

Table III-continued

| | II | III | Y (Y$_1$=Y$_2$) | Shade |
|---|---|---|---|---|
| 5 | N-ethyl-N-β-hydroxyethyl-aniline | phthalic acid dichloride | —COOC$_2$H$_5$ | greenish yellow |
| 6 | N-ethyl-N-β-hydroxyethyl-3-methyl-aniline | oxalyl chloride | —CN | greenish yellow |
| 7 | N-ethyl-N-β-hydroxyethyl-3-methyl-aniline | cyclohexane-1,2-dicarboxylic acid dichloride | —CN | greenish yellow |
| 8 | N-ethyl-N-β-hydroxyethyl-3-methyl-aniline | maleic acid dichloride | —CONH$_2$ | greenish yellow |
| 9 | N-ethyl-N-β-hydroxyethyl-3-methyl-aniline | isophthalic acid dichloride | —CN | greenish yellow |
| 10 | N-ethyl-N-β-hydroxyethyl-3-methyl-aniline | 1,2,5,6-tetra-hydrophthalic acid dichloride | —CN | greenish yellow |
| 11 | N-ethyl-N-β-hydroxyethyl-3-methyl-aniline | glutaric acid dichloride | —SO$_2$— | greenish yellow |
| 12 | N-methyl-N-β-hydroxyethyl-3-chloroaniline | diglycolic acid dichloride | —CN | greenish yellow |
| 13 | N-ethyl-N-β-hydroxyethyl-3-methyl-aniline | thiophene-2,5-dicarboxylic acid dichloride | —CN | greenish yellow |
| 14 | N-ethyl-N-β-hydroxyethyl-aniline | thiophene-2,5-dicarboxylic acid dichloride | —CN | greenish yellow |
| 15 | N-β-cyanoethyl-N-β-hydroxyethyl-aniline | thiophene-2,5-dicarboxylic acid dichloride | —CN | greenish yellow |
| 16 | N-ethyl-N-β-hydroxyethyl-3-methyl-aniline | thiophene-2,5-dicarboxylic acid dichloride | —CN | greenish yellow |
| 17 | N-β-cyanoethyl-N-β-hydroxy-ethylaniline | thiophene-2,5-dicarboxylic acid dichloride | —CN | greenish yellow |
| 18 | N-ethyl-N-β-hydroxyethyl-aniline | thiophene-2,5-dicarboxylic acid dichloride | —CN | greenish yellow |
| 19 | N-ethyl-N-β-hydroxyethyl-aniline | thiophene-2,5-dicarboxylic acid dichloride | —COOC$_2$H$_5$ | greenish yellow |
| 20 | N-ethyl-N-β-hydroxyethyl-aniline | thiophene-2,5-dicarboxylic acid dichloride | —SO$_2$— | greenish yellow |
| 21 | N-ethyl-N-β-hydroxyethyl-aniline | thiophene-2,5-dicarboxylic acid dichloride | —CONH$_2$ | greenish yellow |
| 22 | N-ethyl-N-β-hydroxyethyl-aniline | pyridine-2,5-dicarboxylic acid dichloride | —CN | greenish yellow |
| 23 | N-ethyl-N-β-hydroxyethyl-3-methyl-aniline | 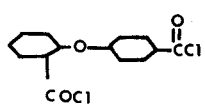 | —CN | greenish yellow |
| 24 | N-β-cyanoethyl-N-β-hydroxy-ethylaniline | 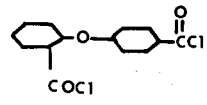 | —CN | greenish yellow |
| 25 | N-ethyl-N-β-hydroxyethyl-3-methyl-aniline | 5-nitro-isophthalic acid dichloride | —CN | greenish yellow |
| 26 | N-β-cyano- | 5-nitro-iso- | —CN | greenish |

Table III-continued

| | II | III | Y (Y₁=Y₂) | Shade |
|---|---|---|---|---|
| | ethyl-N-β-hydroxyethyl-aniline | phthalic acid dichloride | | yellow |
| 27 | N-ethyl-N-β-hydroxyethyl-aniline | fumaryl chloride | —CN | greenish yellow |
| 28 | N-ethyl-N-β-hydroxyethyl-aniline | 1,4-cyclohexane-dicarboxylic acid dichloride | —CN | greenish yellow |
| 29 | N-ethyl-N-γ-methylamino-propyl-aniline | adipic acid dichloride | —CN | greenish yellow |
| 30 | N-ethyl-N-γ-methylamino-propyl-aniline | phthalic acid dichloride | —CN | greenish yellow |
| 31 | N-ethyl-N-γ-methylamino-propyl-aniline | phosgene | —CN | greenish yellow |
| 32 | N-ethyl-N-γ-methylamino-propyl-aniline | thiophene-2,5-dicarboxylic acid dichloride | —CN | greenish yellow |
| 33 | N-ethyl-N-γ-methylamino-propyl-aniline | 1,2,5,6-tetra-hydro-phthalic acid dichloride | —CN | greenish yellow |
| 34 | N-ethyl-N-γ-methylamino-propyl-aniline | diglycolic acid dichloride | —CN | greenish yellow |
| 35 | N-ethyl-N-γ-methylamino-propyl-aniline | toluylene-2,4-diisocyanate | —CN | greenish yellow |
| 36 | N-ethyl-N-γ-methylamino-propyl-aniline | OCN—⟨⟩—CH₂—⟨⟩—NCO | —CN | greenish yellow |
| 37 | N-ethyl-N-γ-methylamino-propyl-aniline | hexane-1,6-diisocyanate | —CN | greenish yellow |
| 38 | N-ethyl-aniline | 1,4-bis(bromo-methyl)-benzene | —CN | greenish yellow |
| 39 | N-ethyl-N-γ-aminopropyl-aniline | phthalic acid dichloride | —CN | greenish yellow |

EXAMPLE 8

A dyestuff identical with the one described in Example 1 (Table III) can be manufactured in the following manner:

4.82 Parts (0.02 mol) of the dyestuff of the formula

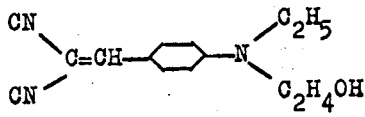

in 20 parts by volume of benzene were treated with a solution of 1.1 parts by volume of succinic acid dichloride in 10 parts by volume of benzene, the solution being added slowly while stirring. The batch was then heated for 1 hour under reflux while stirring, and then discharged into iced water; extraction was effected with chloroform, and the chloroform phase was extracted first with a 10% sodium carbonate solution and then with 2N hydrochloric acid, washed neutral with water, dried with sodium sulphate and evaporated. The oil which remained was dissolved in hot methanol/ethyl acetate. After some time, 3 parts of the dyestuff described in Example 1, Table III crystallized out in the form of an orange product.

Analysis: Calculated: C 68.1% H 5.7% N 14.9%
Found: C 67.8% H 5.7% N 14.7%

EXAMPLE 9

30 Millilitres of phosgene are introduced into a sulphonating flask having a capacity of 750 ml, 100 ml of anhydrous chlorobenzene are added and then 1/10 mol of N-β-hydroxyethyl-N-β-cyanoethylaniline in 50 ml of anhydrous chloro-benzene is added at a temperature of −30° to −70°C. It is rinsed with 50 ml of chlorobenzene, the batch is allowed to rise to room temperature, and then slowly heated to 80° to 85°C phosgene being conducted through it until a clear solution forms. The excess of phosgene is removed with nitrogen, 1/10 mol of N-ethyl-N-β-hydroxyethyl-1,3-toluidine is added to the solution, and the batch is then heated under reflux for 3 days while stirring. After cooling, the solution is extracted with dilute hydrochloric acid, washed neutral, dried, and the solvent is removed in vacuo. After standing for some time, the product begins to crystallize; it is then well triturated with cold ether, filtered, and dried in vacuo at 40°C. The product of the formula

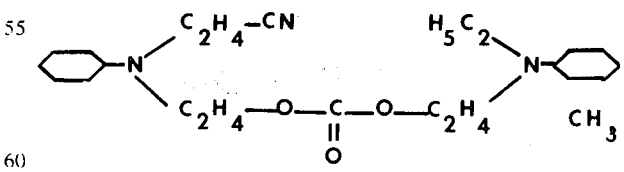

is obtained.

When this product is formylated according to Vilsmeier and the dialdehyde is condensed with malonic acid dinitrile by a process analogous to the one described in Example 6, the dyestuff of the formula

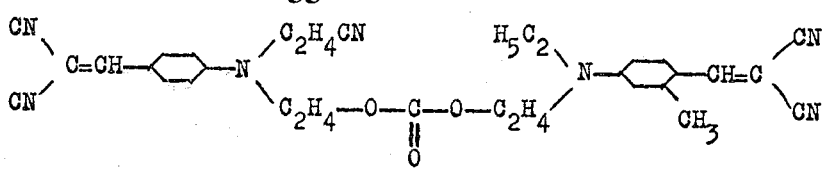

is obtained in the form of an olive powder.

EXAMPLE 10

19 Parts of N-β-hydroxyethyl-N-β-cyanomethylaniline in 100 parts of chlorobenzene are added dropwise at 0°C to 100 parts of chlorobenzene saturated with phosgene. The batch is stirred for 3 hours at that temperature while constantly introducing phosgene and stirring. The batch is then heated to about 50°C to 55°C, stirred for about 30 minutes at that temperature, and is then heated to 80° to 85°C. Phosgene is introduced at that temperature while stirring until a clear solution forms. The excess of phosgene is then removed with nitrogen and the hot solution is filtered. The solution so obtained is added to 19 parts of N-β-hydroxyethyl-N-β-cyanoethylaniline and the whole is heated under reflux for 24 hours while stirring. The solvent is completely removed in vacuo and 10 ml of ethanol are added to the residue. The major proportion of the residue solidifies after two to three days. The residue is isolated by filtration, triturated with cold ethanol and again isolated by filtration. After recrystallization, the product of the formula

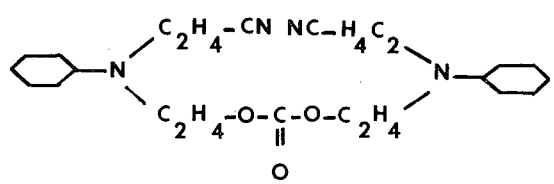

is obtained.

Analysis: Calculated: C 67.96% H 6.45% N 13.79%
Found: C 68.21% H 6.37% N 13.56%.

4.1 Parts of this product are introduced at 15° to 20°C into a mixture of 9.2 parts by volume of dimethylformamide and 14.2 parts by volume of phosphorus oxychloride while stirring, and the batch is then stirred for 6 hours at 60°C, discharged on to ice, chloroform is added and the mixture is neutralized with sodium hydroxide solution. The chloroform phase is washed with a sodium chloride solution, dried with sodium sulphate and concentrated; 4.7 parts of the dialdehyde remain in the form of an oil. The oil is dissolved in hot methanol, 1.4 parts of malonic acid dinitrile and 0.1 part by volume of piperidine are added to the solution and the whole is heated under reflux for 4 hours. During cooling, the dyestuff of the formula

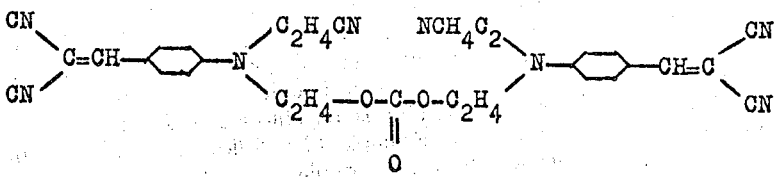

is obtained in the form of an oil, which solidifies after some time. It is triturated in a mortar with a small amount of methanol, isolated by suction filtration and washed with petroleum ether. After drying at 70°C, 3.2 parts of a brown-yellow powder are obtained.

EXAMPLE 11

36 Parts of N-ethyl-N-(β-hydroxyethyl)-meta-toluidine together with 12.5 parts of carbonic acid diethyl ester and 0.2 part of sodium are slowly heated to 170°C in an oil bath, during which process ethanol distils. After some time the batch is allowed to cool, the residue is dissolved in benzene, and extracted with water. The benzene phase is dried, the benzene is evaporated and the crude product is distilled. 18.2 Parts of a pale yellow oil boiling at 195° to 205°C under a pressure of 0.02 mm Hg are obtained which corresponds to the formula

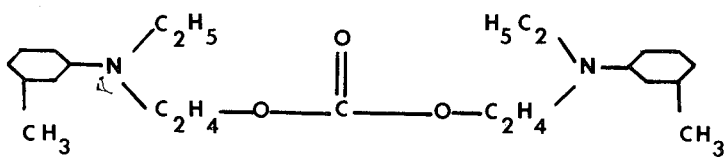

Analysis: Calculated: C 71.8% H 8.4% N 7.3%
Found: C 72.3% H 8.4% N 7.2%.

7.7 Parts of the carbonic acid ester so obtained are introduced at 15° to 20°C while stirring into a Vilsmeier mixture comprising 18.6 parts by volume of dimethylformamide and 28.6 parts by volume of phosphorous oxychloride, the batch is stirred for 5 hours at 60°C, discharged into iced water, the pH is adjusted to 7 with sodium hydroxide solution, the product is dissolved in chloroform, the chloroform phase is washed with a sodium chloride solution, dried with sodium sulphate and concentrated. 8 Parts of the dialdehyde of the formula

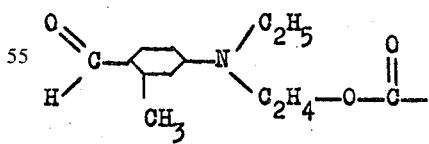

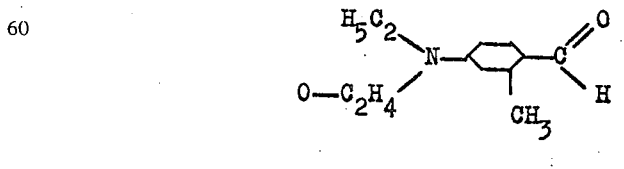

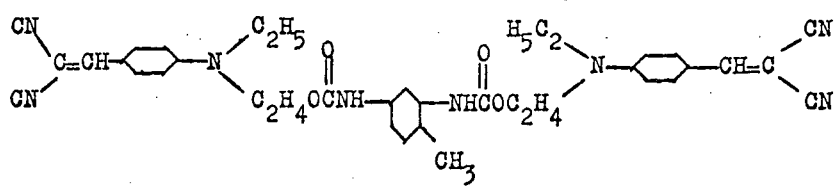

remain.

21 Parts of the dialdehyde so obtained, together with 7 parts of malonic acid dinitrile and 0.5 part of piperidine, are heated for 4 hours under reflux in 300 parts by volume of methanol, during which process an orange, crystalline precipitate forms. After cooling to room temperature, the product of the formula

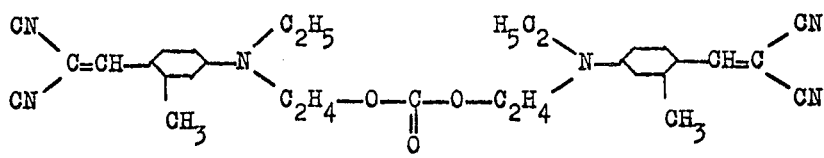

is isolated by suction filtration and washed with alcohol. After drying, 17.4 parts of dyestuff remain. It dyes cellulose acetate and polyester materials pure greenish yellow shades having excellent properties of fastness; it also has good building-up properties.

Analysis: Calculated: C 69.4% H 6.0% N 15.7%
Found: C 69.1% H 6.0% N 15.5%

EXAMPLE 12

50 Parts of N-ethyl-N-(β-hydroxyethyl)-aniline and 26 parts of toluylene-2,4-diisocyanate in 50 parts of anhydrous benzene are heated in a bath at 90° to 95°C. On cooling, 73.3 parts of the crude product crystallize out in the form of colourless crystals melting at 108° to 115°C. After a single recrystallization from methanol, the melting point is 113° to 116°C.

The product corresponds to the formula

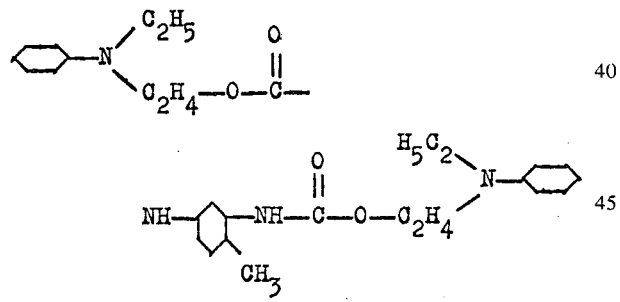

Analysis: Calculated: C 69.0% H 7.2% N 11.1%
Found: C 69.1% H 6.9% N 11.5%.

10 Parts of the diurethane so obtained are formylated with a mixture of 18.6 parts by volume of dimethylformamide and 28.6 parts by volume of POCl$_3$. The dialdehyde of the formula

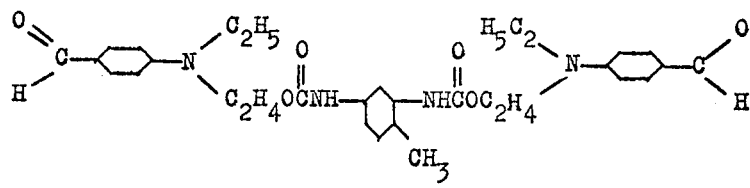

is obtained. 2.8 Parts of this dialdehyde, together with 0.7 part of malonic acid dinitrile and 0.1 part of piperidine, are heated under reflux for 4 hours in 50 parts by volume of ethanol. On cooling, the dyestuff of the formula precipitates in the form of an oil, which in time solidifies. It is triturated in ethanol in a mortar, isolated by suction filtration and washed with petroleum ether.

After drying at 60°C, 1.5 parts of an orange powder are obtained.

EXAMPLE 13

By using 54 parts of N-ethyl-N-(β-hydroxyethyl)-metatoluidine, 25 parts of hexamethylene-1,6-diisocyanate and 50 parts of benzene and following the procedure described in Example 12, but also with the addition of 80 parts of ethyl alcohol after the batch has cooled, 46 parts of a crude product melting at 58° to 60°C are obtained. After a single recrystallization from methanol, the melting point is at 60° to 62°C. The product corresponds to the formula

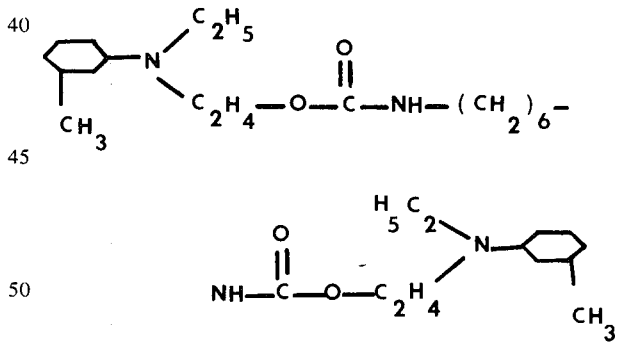

Analysis: Calculated: C 68.4% H 8.8% N 10.6%
Found: C 68.4% H 8.6% N 10.5%.

When 10.4 parts of the diurethane so obtained are formylated with a mixture comprising 18.6 parts by volume of dimethylformamide and 28.6 parts by volume of phosphorus oxychloride and the procedure described in Example 12 is followed, 11 parts of the dialdehyde of the formula

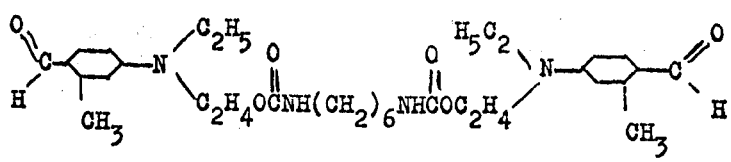

are obtained in the form of a light brown, semi-solid crystalline mass.

5.8 Parts of the product so obtained, together with 1.4 parts of malonic acid dinitrile and 0.15 part of piperidine, are heated for 5 hours under reflux in 60 parts by volume of absolute alcohol and 30 parts by volume of dimethylformamide. The solution is then poured into 1,000 parts of water while stirring, the batch is acidified, and the brown-orange product of the formula

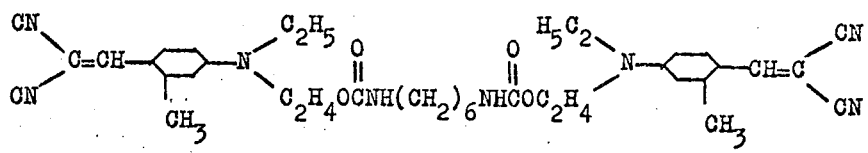

which precipitates is isolated by suction filtration and washed with water. After drying, 4 parts of the dyestuff are obtained.

Table IV below lists components which can be used to produce further valuable bis-styryl dyestuffs. The dyestuffs are obtained by condensing 2 mols of the N-β-hydroxyethylamines listed in Column II with 1 mol of the bis-isocyanates listed in Column III, formylating according to Vilsmeier and condensing the dialdehydes so obtained with a compound of the formula CN—CH$_2$—X, the process being analogous to that described in Example 13. The dyestuffs obtained dye cellulose acetate, and especially polyester materials, greenish yellow shades possessing excellent properties of fastness.

Table IV

| | II | III | X | Shade |
|---|---|---|---|---|
| 1 | N-ethyl-N-β-hydroxyethyl-3-methylaniline | toluylene-2,4-diisocyanate | —CN | yellowish green |
| 2 | N-ethyl-N-β-hydroxyethyl-3-methyl-aniline | toluylene-2,4-diisocyanate | —COOC$_2$H$_5$ | yellowish green |
| 3 | N-ethyl-N-β-hydroxyethyl-aniline | hexane-1,6-di-isocyanate | —CN | yellowish green |
| 4 | N-methyl-N-β-hydroxyethyl-aniline | hexane-1,6-di-isocyanate | —CN | yellowish green |
| 5 | N-methyl-N-β-hydroxyethyl-aniline | phenylene-1,4-diisocyanate | —CN | yellowish green |
| 6 | N-methyl-N-β-hydroxyethyl-aniline | phenylene-1,4-diisocyanate | —COOC$_2$H$_5$ | yellowish green |
| 7 | N-ethyl-N-β-hydroxyethyl-aniline | phenylene-1,4-diisocyanate | —CN | yellowish green |
| 8 | N-β-hydroxyethyl-1,2,3,4-tetrahydroquinoline | phenylene-1,4-diisocyanate | —CN | yellowish green |
| 9 | N-ethyl-N-β-hydroxyethyl-aniline | OCN—⟨⟩—CH$_2$—⟨⟩—NCO | —CN | yellowish green |
| 10 | N-ethyl-N-β-hydroxyethyl-3-methyl-aniline | OCN—⟨⟩—CH$_2$—⟨⟩—NCO | —CN | yellowish green |
| 11 | N-ethyl-N-β-hydroxyethyl-3-methyl-aniline | OCN—⟨⟩—CH$_2$—⟨⟩—NCO | —COOC$_2$H$_5$ | yellowish green |
| 12 | N-ethyl-N-β-hydroxyethyl-3-chloro-aniline | OCN—⟨⟩—CH$_2$—⟨⟩—NCO | —CN | yellowish green |

EXAMPLE 14

0.2 Part of sodium is dissolved by heating it in 35.8 parts of N-ethyl-N-β-hydroxyethyl-meta-toluidine; 41.4 parts of N-ethyl-N-β-carbomethoxyethyl-aniline are added and the batch is slowly heated to 250°C while stirring, during which process methanol distils. The residue is distilled in a high vacuum. The product of the formula is obtained in the form of a colourless oil boiling at 185° to 195°C under a pressure of 0.1 mm Hg.

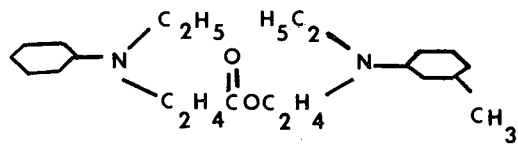

Analysis: C calculated: 74.5% H calculated: 8.5%
C found: 74.4% H found: 8.3%

When this amine is formulated according to Vilsmeier and the dialdehyde is condensed with malonic acid dinitrile in a manner analogous to that described in Example 6, the dyestuff of the formula

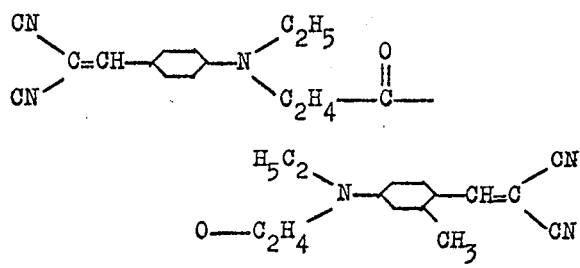

is obtained which dyes cellulose acetate and polyester materials greenish yellow shades possessing very good properties of fastness.

We claim:

1. A dyestuff of the formula

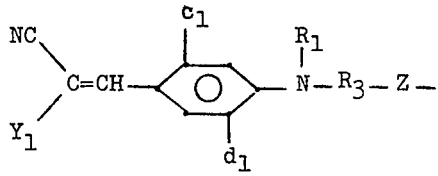

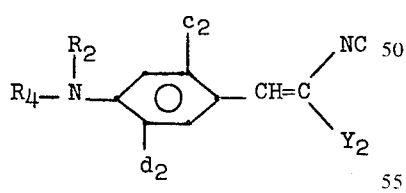

in which
  $Y_1$ and $Y_2$ each is cyano, carbamoyl, phenylsulfonyl or -COOR where R is lower alkyl,
  $c_1$, $c_2$, $d_1$ and $d_2$ each independently is hydrogen, halogen, lower alkyl, lower alkoxy, thioophenoxy or phenoxy, and $c_1$ and $c_2$ can each independently also be $CF_3$, lower alkanoylamino, lower alkylsulfonyl, lower alkylsulfonamido,
  $R_1$ and $R_2$ each independently is hydrogen, lower alkyl, and lower alkyl substituted by phenyl, halogen, cyano, lower alkoxy, hydroxy, lower alkanoyloxy, lower alkanoylamino, lower alkylcarbamoyloxy, phenoxy, cyanoloweralkoxy, and lower alkoxycarbonyl,
  $R_3$ and $R_4$ each independently is alkylene, alkanoyloxyalkylene, alkylcarbamoyloxyalkylene, alkoxyalkylene or hydroxyalkylene, each containing up to 6 carbon atoms
  Z is $-O-R_5-O-$ where $R_5$ is phenylene or $C_2-C_4$ alkylene, or Z is $-O-$ or

where $R_7$ is lower alkyl.

2. A water-insoluble styryl dyestuff of the formula

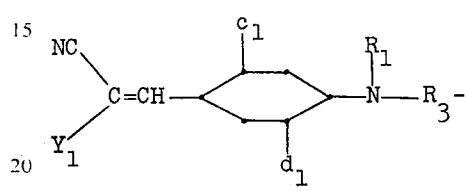

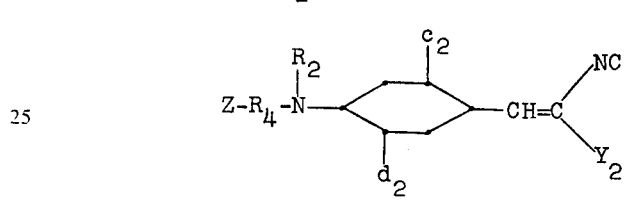

wherein
  $Y_1$ and $Y_2$ are cyano, carbamyl, phenylsulfonyl, or -COOR where R is $C_1-C_4$ alkyl,
  $c_1$, $c_2$, $d_1$, and $d_2$ independently are hydrogen, $C_1-C_2$ alkyl, chloro, or $C_1-C_2$ alkoxy,
  $R_1$ and $R_2$ are each hydrogen, $C_1-C_4$ alkyl, $C_1-C_3$ haloalkyl, cyanoethyl, $C_1-C_5$ alkoxyalkyl, or $C_1-C_3$ hydroxyalkyl,
  $R_3$ and $R_4$ each is alkylene or alkylene substituted by hydroxy, alkoxy, alkanoyloxy or alkylcarbamoyloxy, each containing up to 6 carbon atoms, and $R_4$ additionally can be a direct bond, and
  Z is $-O-R_5-O-$ where $R_5$ is $C_2-C_4$ alkylene or Z is $-O-$.

3. A dyestuff according to claim 2 in which $Y_1$ and $Y_2$ is each cyano, $d_1$ and $d_2$ are each hydrogen; $R_1$ and $R_2$ are $C_1-C_4$ alkyl, $R_3$ and $R_4$ are alkylene.

4. The dyestuff of the formula

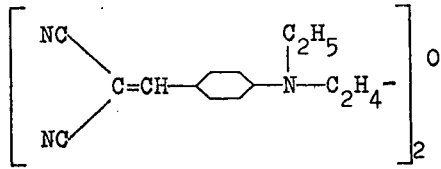

5. The dyestuff of the formula

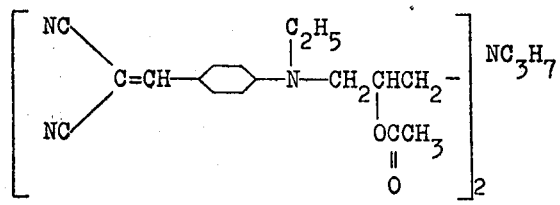

* * * * *